United States Patent [19]

Ruszowski

[11] Patent Number: 5,560,531
[45] Date of Patent: Oct. 1, 1996

[54] REFLOW MINIOVEN FOR ELECTRICAL COMPONENT

[75] Inventor: Czes A. Ruszowski, Yonkers, N.Y.

[73] Assignee: O.K. Industries, Inc., Yonkers, N.Y.

[21] Appl. No.: 355,669

[22] Filed: Dec. 14, 1994

[51] Int. Cl.$^6$ .................................................... B23K 1/018
[52] U.S. Cl. .............................. 228/19; 228/191; 228/264
[58] Field of Search ............................ 228/19, 191, 264, 228/6.2

[56] References Cited

U.S. PATENT DOCUMENTS

| | | | |
|---|---|---|---|
| 4,752,025 | 6/1988 | Stach et al. | 228/191 |
| 4,767,047 | 8/1988 | Todd et al. | 228/191 |
| 4,799,617 | 1/1989 | Friedman | 228/191 |
| 5,419,481 | 5/1995 | Lasto et al. | 228/191 |

Primary Examiner—P. Austin Bradley
Assistant Examiner—Jeffrey T. Knapp

[57] ABSTRACT

A reflow miniovens is available for soldering/desoldering of BGA and SMT individual components on a printed circuit board (PCB). The minioven is comprised of an apparatus whose top and side oven walls are configured as a gas delivery head terminating in a detachable nozzle fitted over the component, which gas delivery head provides gas delivery and vacuum application apparatus, and with the oven bottom being the PCB and the component being soldered/desoldered being positioned directly above a preheater placed in a table on which an open frame construction board holder holding the PCB is supported, allowing placement of any surface on the PCB in direct and unobstructed view of the preheater. The nozzle is configured to direct heated gas to the component and to direct exhaust gas to a level above the PCB to avoid heating neighboring components on the PCB. A temperature sensor is located inside the minioven directly above the component and forms part of a feedback system which controls gas temperature in the oven during preset time periods. A spring-loaded vacuum pick-up member can be located over a component which is to be desoldered and which lifts the component automatically after the solder connections have reached reflow temperature.

16 Claims, 7 Drawing Sheets

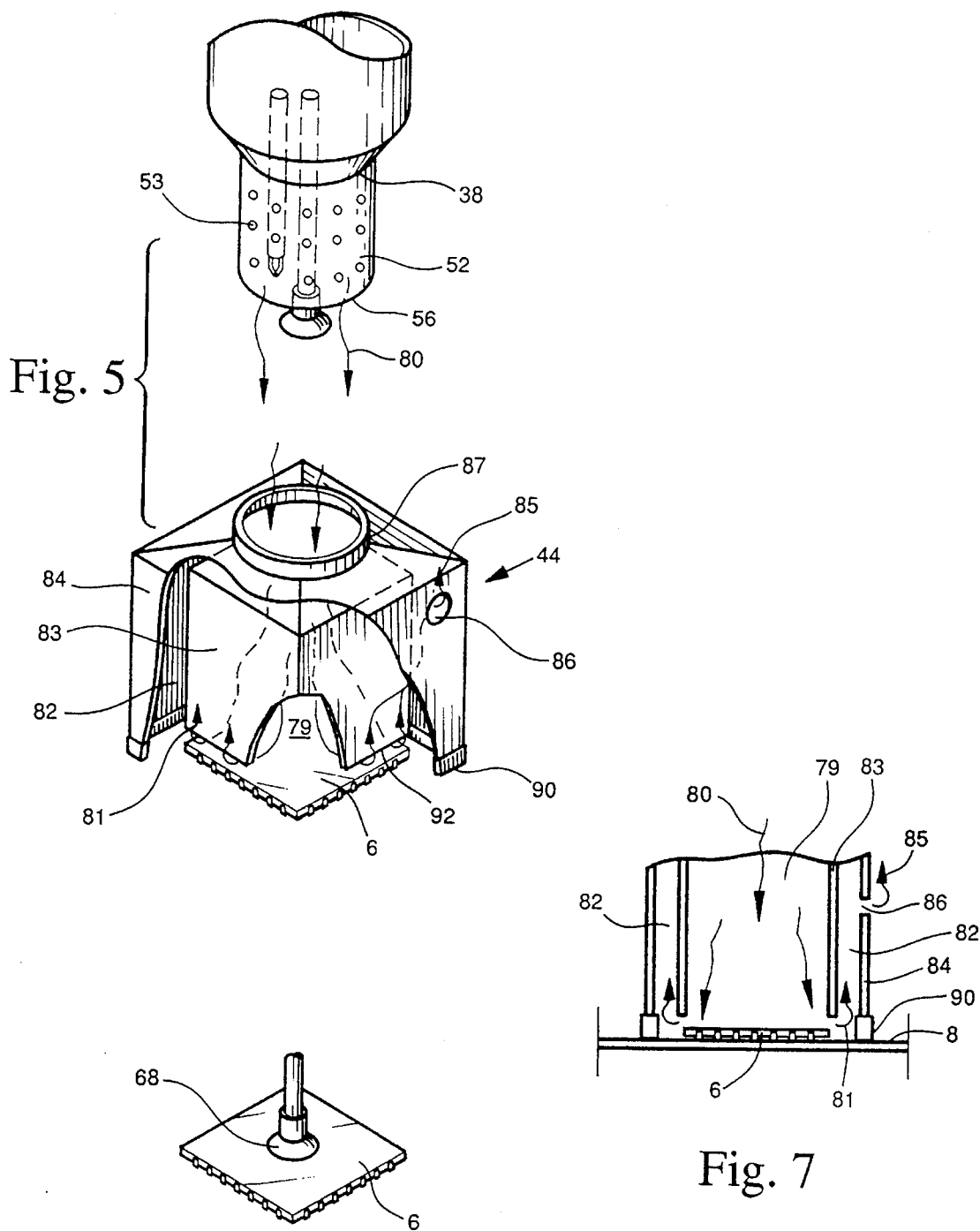

MINIOVEN PROFILE

REFLOW MINIOVEN FOR ELECTRICAL COMPONENT

This invention relates to apparatus for the repair, rework, and assembly of electrical components on a printed circuit board (PCB). In particular, it relates to the assembly, repair, or rework of individual ball grid array (BGA) components and four sided surface mount technology (SMT) components for attachment to or detachment from PCBs.

BACKGROUND OF THE INVENTION

BGA components typically comprise plastic or ceramic packaged integrated circuit (IC) components in which the external contacts on the package for the IC chip on the inside is in the form of a plurality of solder bumps, typically as solder balls or as tiny columns. A common construction is a high melting temperature solder ball. The top part of the ball is soldered to the package and makes electrical contact with the chip terminals. The bottom part is used to solder the component to pads located on the surface of the PCB. To achieve proper soldering, the solder balls, of which there may be anywhere from 10–1000 arranged in rows and columns, must be heated to the melting point of the solder, often referred to in this art as the reflow or eutectic temperature of the solder, meaning the temperature that the solder must reach before it melts and can wet the solder pad. Different components often have different reflow temperatures. In soldering such components, individually, to a PCB, care must be exercised to ensure that the solder reaches the proper reflow temperature but the component is not overheated to avoid the internal chip parts or the package from being damaged.

Apparatus is available for soldering a plurality of components to a PCB, by placing the entire PCB inside an oven that is programmed to subject the entire PCB to a controlled heating cycle involving a first preheat or ramp stage to some intermediate temperature to avoid thermal shock and control flux paste evaporation, followed by a second preheat or soak stage at a higher temperature wherein the flux is activated but still at a temperature below the reflow temperature, followed by a reflow or spike stage when the temperature is quickly raised to the reflow temperature and the solder goes from the solid to the liquid stage but only for a short duration to minimize PCB or component damage, followed finally by a controlled cooling stage to well below that of the second preheat stage. Such ovens can use radiant (IR) heaters for the first and second preheat stages, to which is added forced air convection heating for the reflow stage. Heating can be carried out in air or more commonly in an inert gas such as nitrogen or forming gas.

This equipment, however, is unsuited for processing single components. A common situation is where an operator desires to solder a single component to a PCB to which other components have previously been soldered. The previously described oven cannot be used for this purpose because it would undesirably melt all the existing soldered connections without a suitable flux being present. A similar problem arises when an operator desires to desolder one component from the PCB board without affecting any other soldered components. Still another example is when an operator desires to resolder an existing soldered component if a cold solder joint is suspected.

SUMMARY OF THE INVENTION

It is therefore an object of the invention to provide apparatus capable of handling most commonly sized PCBs and capable of controlling the process of the removal and placement of individual BGA's and SMT's from or on the PCB.

In accordance with a first aspect of the invention, a single component oven, hereinafter referred to as a "minioven", is provided capable of supplying controlled heat to a single component on a PCB without significantly heating the PCB or any adjacent components on the PCB. The single component oven of the invention can be used in any soldering or desoldering process of IC components, and is especially useful for processing BGA and SMT components.

In a preferred embodiment, the oven comprises a base part with a preheater built into a small part of the base part of a size covering the largest sized component expected to be encountered. On the base part is mounted a pedestal supporting a gas delivery head having at its bottom end a generally annular nozzle configured to fit around the outside of the component to be worked. Within the gas delivery head is a suction means for attachment to the component package, with the head arranged to direct heated gas to the component under control of a controller which is capable of subjecting the component to a desired heat cycle. In this arrangement, the oven sides and top is formed by the gas delivery head, while the oven bottom is formed by the PCB area immediately surrounding the component to be worked. The head and nozzle are configured to control the flow of the heated gas to ensure it stays clear of neighboring components.

In a further preferred embodiment, a temperature sensor is provided inside of the gas delivery head. Signals from the temperature sensor are used to control the temperature inside the nozzle.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

BRIEF DESCRIPTION OF THE DRAWINGS

In the drawings:

FIG. 5 is an exploded view illustrating the gas flow within the minioven of FIG. 1;

FIG. 6 is a detail view showing how the suction means of the minioven of FIG. 1 attaches to a component;

FIG. 7 is a schematic side view showing the gas flow in one form of gas delivery means for a minioven in accordance with the invention;

DETAILED DESCRIPTION OF THE PREFERRED EMBODIMENTS

Figure 1:
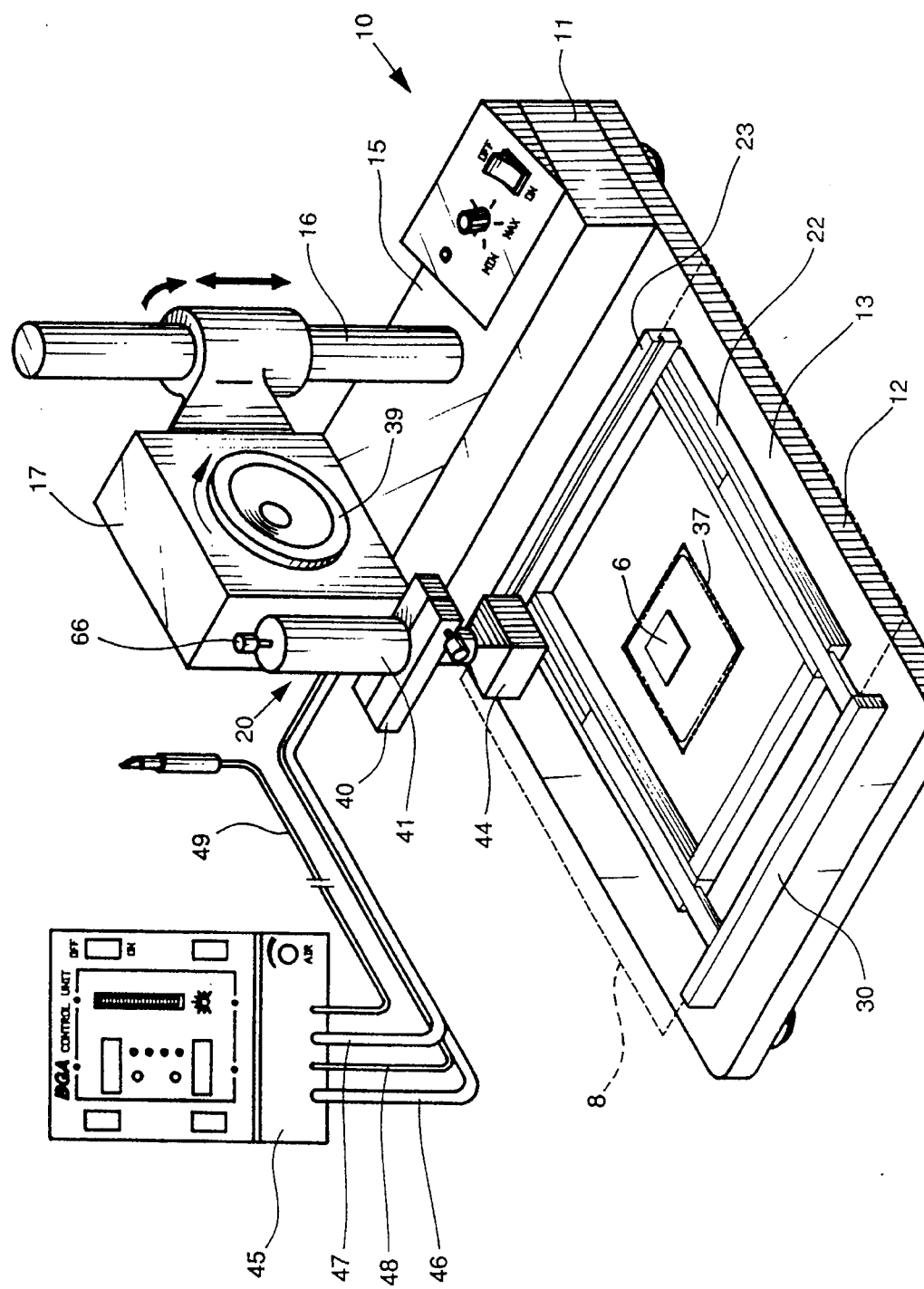
FIG. 1 is a perspective view of one form of minioven in accordance with the invention.
Figure 2:
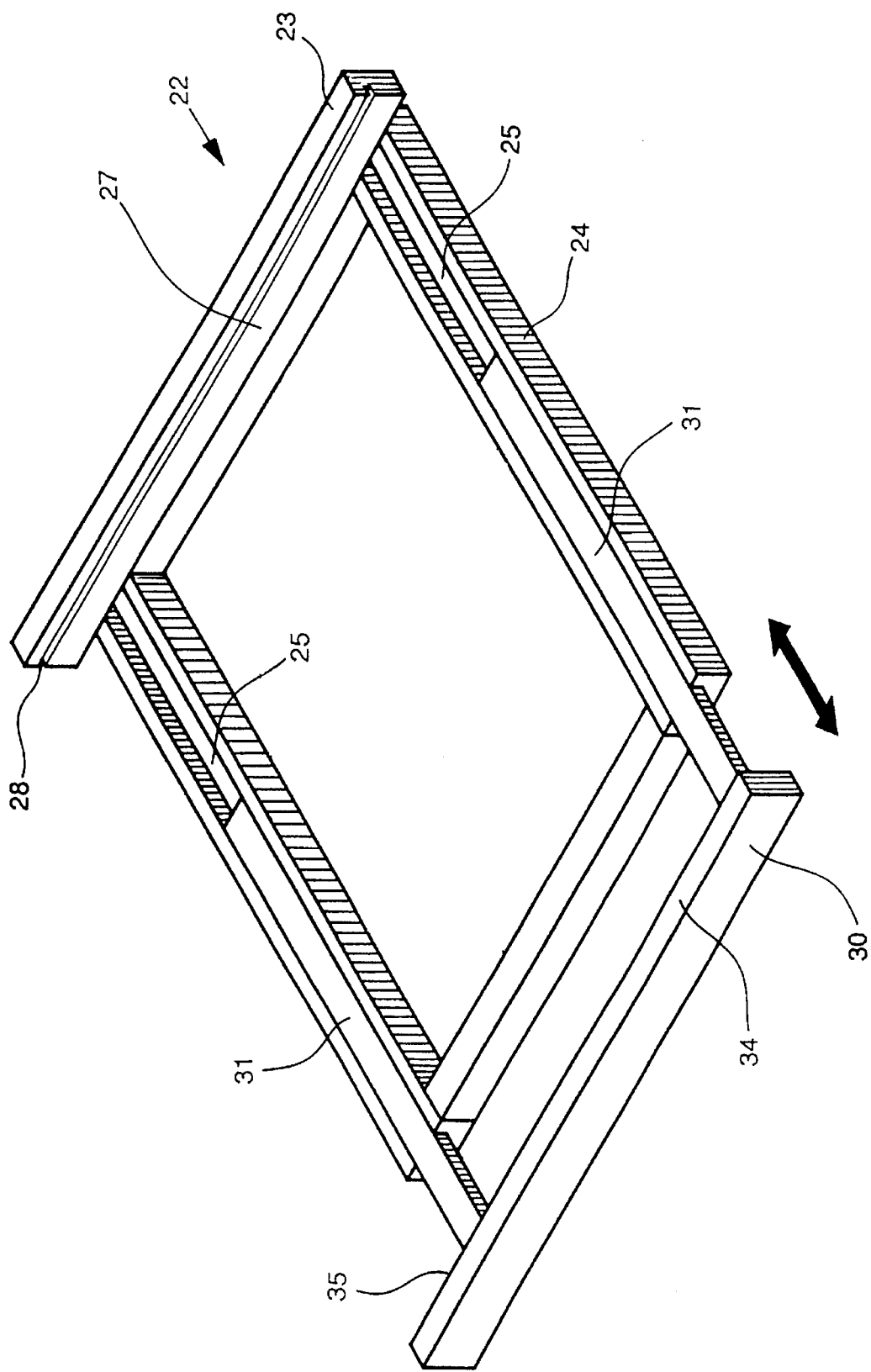
FIG. 2 is a perspective detail view of the PCB holder used in the minioven of FIG. 1.

A minioven 10 according to one form of the invention is shown in perspective in FIG. 1. It includes a rectangular base 11 comprising a table part 12 having a flat surface 13 and a raised section 15 in the rear, housing several controls and supporting a post 16 on which is mounted for up and down as well as rotary motion an arm 17 which supports at its front a gas delivery head 20. The flat surface 13 of the table 12, which may be made of a high temperature resistant plastic or stainless steel, supports an adjustable, open frame board holder 22, also shown in FIG. 2.

The board holder 22 comprises a rear member 23 having a fixed rectangular frame 24 with parallel slots 25 facing upward, and a vertical part 27 with a laterally-facing slot 28. It also includes a U-shaped, mating, front sliding member 30 whose parallel arms 31 are in slideable engagement with the slots 25 of the rear member 23. The front part 34 of the front member also contains on its rearward facing side a laterally-facing slot 35 (not shown) which is parallel to and at the same level as its counterpart slot 28. The center of the mating parts is open and unobstructed. The slots 28 and 35 are sized to receive a PCB 8 by its front and rear edges, shown in FIG. 1 by the dashed lines. The forward and back movement of the front part 30 relative to the fixed rear part 23 allows the frame 22 to accommodate different sized PCBs. If desired, the movable part 30 can be spring-loaded toward the fixed part 24.

Figure 3:
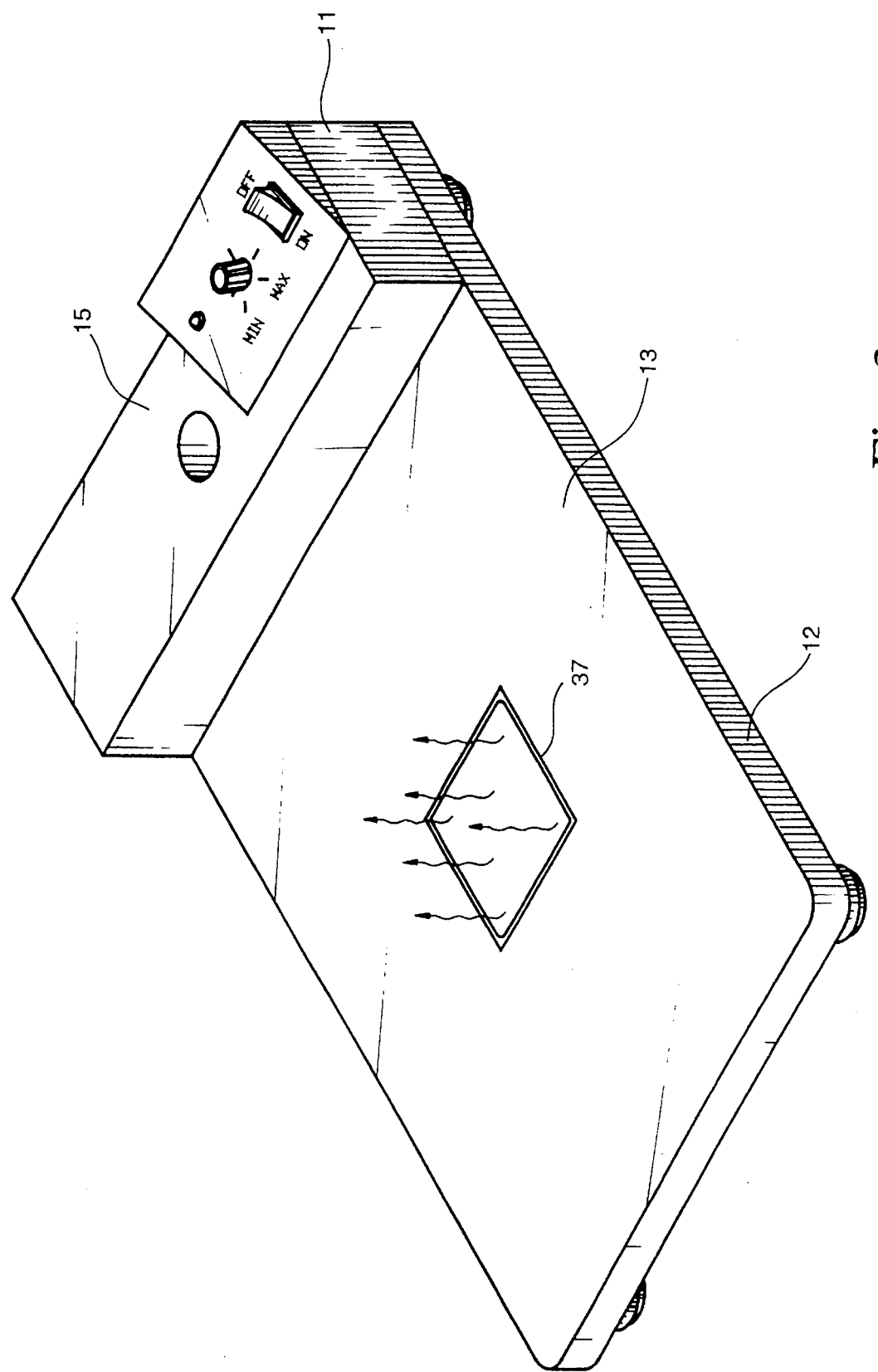
FIG. 3 is a perspective view of the base part of the minioven illustrated in FIG. 1.

The base table 13 contains at its center a buried infrared (IR) preheater 37 in a generally square configuration, mounted flush with the base surface 13 and centrally along the longer axis of the base. The preheater 37 is mounted so that virtually all of its heat is radiated upward, shown by the arrows in FIG. 3. The dimensions of the preheater 37 are chosen so as to be larger in size than the largest component that the minioven is designed to process. The board holder 22 allows mounting of a PCB in such a way that the BGA/SMT component, shown at 6, located anywhere on the PCB 8 can be viewed, from the preheater 37, without any obstruction from the bottom, which allows placement of the component directly above the preheater 37 by sliding the front part 30 in the holder 22 and the holder 22 on the smooth surface 13 of the base 12. Thus, the IR heat will impinge directly on the PCB portion underlying the component 8. Since the average component size is 1 ½"×1½", a suitable nozzle preheater size is about 2"×2".

The arm 17 contains a conventional mechanism (not shown) allowing for up and down (Z) movement controlled by a knob 39. The rotation of the arm 17 about the post 16 can be adjusted manually or by a mechanism if desired, and its position locked by conventional means not shown.

The arm 17 supports an adjustable mount 40 for releasably supporting a gas delivery means 20 in the form of a generally cylindrical or rectagular cross-sectioned conduit 41 which terminates in a generally nozzle-shaped, detachable member 44 at its lower end. As used herein, "gas" means any fluid substance capable of conveying heat or cold, and includes air as well as inert gasses such as nitrogen. The movements of the arm 17 together with positioning of the frame holder 22 allows the nozzle end 44 to be placed over any component positioned on a PCB held in the frame 22 while the component is over the preheater 37.

The front panel of a control unit for the minioven is shown at 45, and contains indicia and controls for incorporated conventional circuitry (not shown) allowing to set temperature and time durations for gas delivery and vacuum as well as display process control parameters for establishing a desired temperature profile for the minioven and for providing the vacuum or suction to operate a pick-up device. Such a control unit is similar to the controllers used for the board preheating ovens described in the Background section of this specification, and the electronic circuitry necessary to achieve desired temperature profiles is well known in the art as well as being commercially available. In addition, the control unit 45 is provided with a first conduit 46 connected to the gas delivery head 20 for delivering a first type of cold gas, a second conduit 47 connected to the gas delivery head 20 for delivering a second type of cold gas, and a third conduit 48 connected to the gas delivery head 20 for delivering vacuum. Also connected is a pad cleaning tool 49 that can be used to clean a pad on the PCB. By "cold" is meant a gas at room temperature or up to the preheat temperature.

Figure 4:
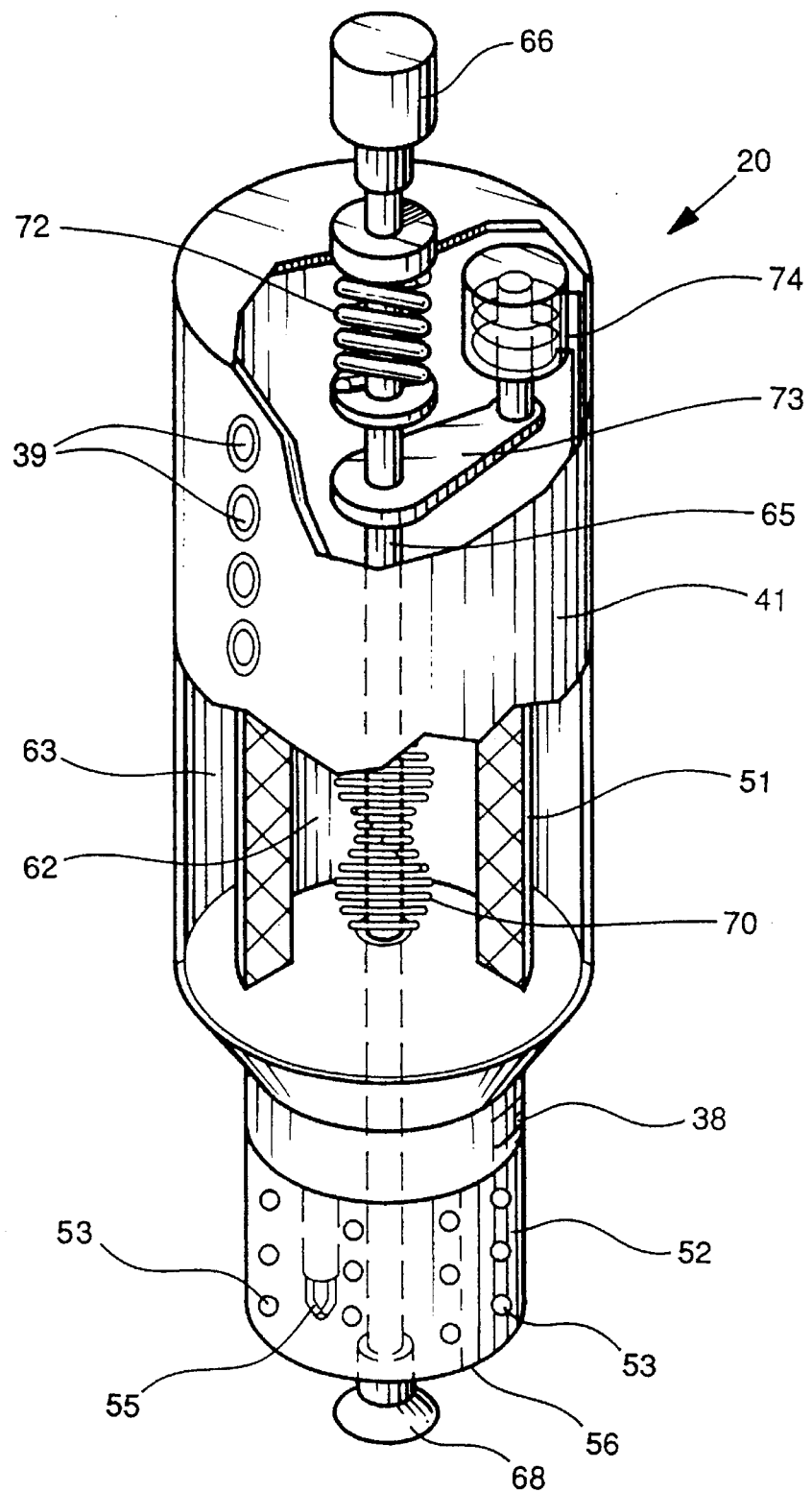
FIG. 4 is a perspective view, with parts of the housing cutaway, of the gas delivery head part of the minioven illustrated in FIG. 1.

A feature of the invention is the construction of the gas delivery head 20 illustrated in greater detail in FIG. 4. The conduit 41 comprises at its side openings or nozzles 39 for coupling the three conduits 46, 47, and 48 to the conduit 41 for the delivery of the gases and vacuum described. The fourth opening is for passing through electrical wire connections which include power and sensing to a heat exchanger and sensor. On the inside is mounted a cylindrical heat-insulating structure 51 for directing incoming gas downward toward a downward extending cylindrical extension 52 provided with perforations 53 and with a gas temperature sensor 55 located close to the bottom edge 56. The heat-insulating stucture 51 defines a center heat-exchanger region 62 and an outer region 63 between the heat-insulating structure 51 and the outside conduit 41. A stainless steel hollow tube 65 is fixedly mounted within the conduit 41, and its top is closed off with a widened extension 66 which projects above the gas delivery head 20. At the tube bottom is mounted a resilient hollow cap 68 of the type used in vacuum pick-up devices. The vacuum conduit 48 (not shown in FIG. 4) is connected to the hollow tube 65 so that vacuum can be established at the cap 68 which when placed in contact with a component will allow the component to be lifted up. When the vacuum is broken, the component will drop off. An electric heater 70 is mounted in the center of the region 62 which will serve as a heat-exchange region for heating incoming gas to any desired temperature. The bottom extension 52 is provided with screw threads 38 or other means for detachably supporting the nozzle 44, which forms the side and bottom part of the minioven, in such a way that the extension 52 goes inside the nozzle 44 and the bottom edge 56 of the extension is directly above and in very close proximity to the component 6 over which the nozzle 44 is placed during a soldering/desoldering process.

The tube 65 is spring loaded in such a way that a tension spring 72 pulls the tube upwards when a lock mechanism for the tube, represented by an arm 73, releases the tube 65, lifting the component off the PCB during a desoldering/removal cycle when attached to the component and when vacuum is applied. The lock can be actuated electrically by any well known release mechanism, such as a solenoid 74. When in the released or up position, an operator can push down the tube top 66 and the tube 65 will move down against the spring pressure and automatically relock in its down position. Positioning the gas delivery head 20 over a component and moving it down until the bottom edge 90 of the nozzle 44 contacts the PCB surface 8 surrounding the component will cause the cap 68 to contact the component top so that when vacuum is applied the cap will adhere to the component. The spring 72 has sufficient play to accommodate components of different heights. The opening 39 at the top is to deliver gas to conduit 41 and further through heat exchanger inner conduit 62 to the nozzle 44 via the perforated extension 52. The opening 39 below the top opening is for delivering gas to outer chamber 63 and further to the nozzle 44 via the perforated extension 52 bypassing the heat exchanger 62 so that the gas remains cool.

FIGS. 5 and 7 illustrate a preferred construction of the nozzle 44 wherein hot/cold, temperature-controlled gas 80 blows directly on the component body 6 via a central chamber 79 and is exhausted 81 through a 4-sided annular channel 82 formed between an inner 4-sided member 83 of the nozzle 44 and its outer 4-sided part 84 and flows out 85 through holes 86 located in the upper part of the nozzle outer member 84, high above the PCB level avoiding the blowing of hot exhaust gas on components adjacent to the component under rework. The inner and outer nozzle sections 83, 84 are joined at a reduced section part 87 which attaches to the gas delivery head 20 at its bottom 38. The perforated section 52 nests within the inner nozzle section 83 and the perforations 53 allow the gas to be distributed evenly over the whole top surface of the component 6. The bottom of the outer nozzle section 84 is provided with a boot 90 (not shown in FIG. 1) so that it establishes a reasonable seal with the PCB surface when engaged thereto. The boot 90 provides a soft sealing gasket all around the bottom edges allowing for good contact with the PCB which forms the bottom side of the minioven in order to better control the gas temperature by the controller 45 using electrical feedback from the sensor 55. As an example of suitable dimensions, which is not to be considered limiting, for a component thickness that does not exceed 9 mm with typical solder balls of 50 thousandths of an inch in diameter, the bottom edge 56 of the perforated extension 52 will lie about 10–12 mm above the PCB surface when the latter is contacted by the boot 90 on the outer nozzle part 84. Preferably, the bottom edge 92 of the inner nozzle section 83 lies about 3–5 mm above the top surface of the component, leaving a clearance of that order for the exhausting gas 81.

FIG. 6 shows the suction cap 68 in contact with the component 6. FIG. 7 is a side view showing the gas flow for the nozzle of FIG. 5. It will be understood that a set of different nozzles 44 can be provided to rework components of different sizes. The nozzles will differ mostly in the lateral dimensions of their inner and outer sections 83, 84, and in the height of the edge 92 of the inner section relative to the location of the edge 90 of the outer section. A typical nozzle height is 1¼–1½".

Figure 8:
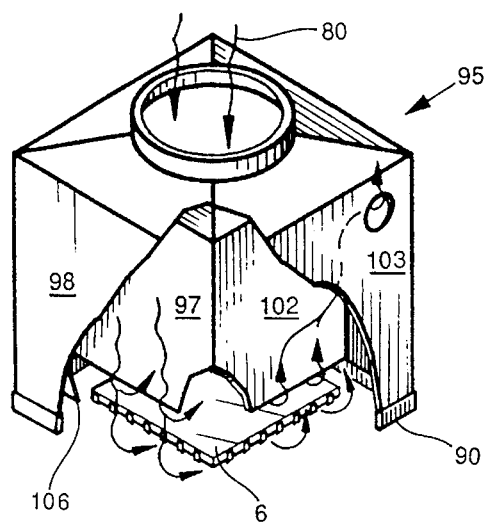
FIGS. 8 and 9 are a perspective view and a schematic side view, respectively, showing the gas flow in a modified form of gas delivery means for a minioven in accordance with the invention.
Figure 9:
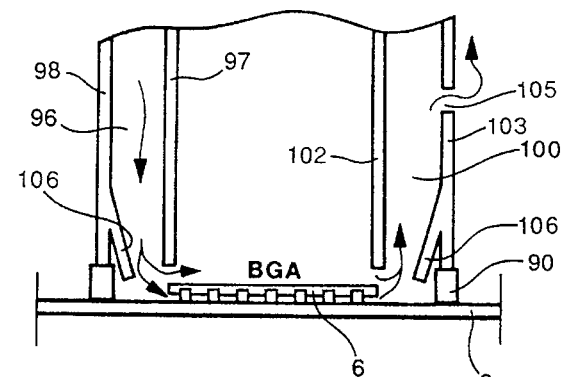

FIG. 8 shows a modified nozzle construction 95 configured in such a way that hot/cold, temperature-controlled gas blows under as well as on the top of the component body from a 2-sided channel 96 formed by first and second adjacent sides 97, 98 of the nested inner and outer nozzle sections and is exhausted through a 2-sided exhaust channel 100 formed between the other third and fourth adjacent sides 102, 103 of the nested inner and outer sections, exiting finally through holes 105 located in the upper part of the nozzle outer section 103. A deflector plate 106 at the bottom helps direct the gas flow both above and below the component 6. This arrangement requires that the perforations 53 of the cylindrical extension 52 are restricted to a narrow section at the top of the cylindrical extension, and that the inner nozzle section is closed off at the top, thereby forcing the incoming gas to flow between the inner and outer nested sections into the channel 96, and then to flow under the component and additionally across the top of the component as shown in FIGS. 8 and 9.

Figure 10:
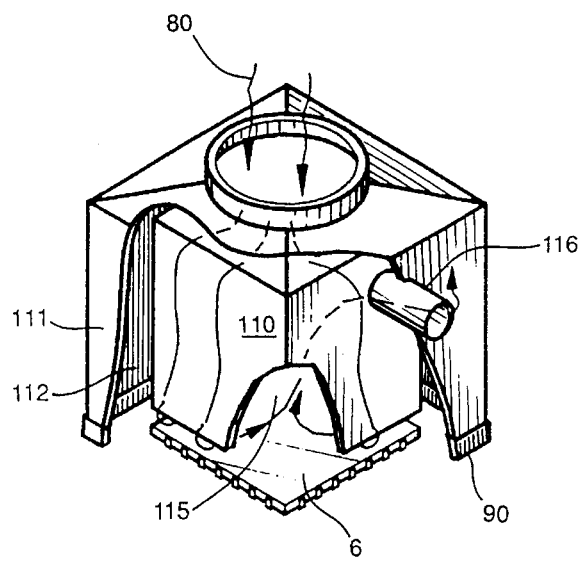
FIGS. 10 and 11 are a perspective view and a schematic side view, respectively, showing the gas flow in still another modified form of gas delivery means for a minioven in accordance with the invention.
Figure 11:
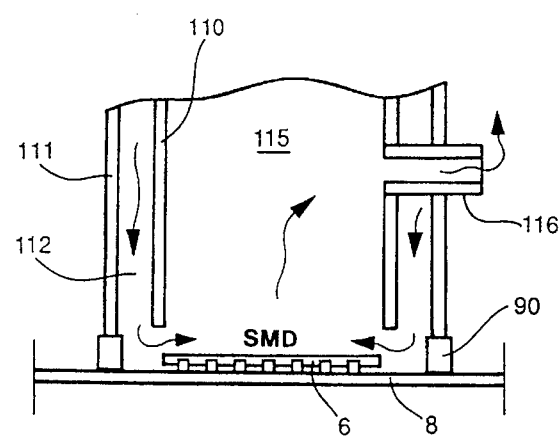

FIGS. 10 and 11 show still another variation, which is a combination of features taken from the embodiments of FIGS. 5 and 8. In the FIG. 10 embodiment, the inner nozzle section 110 and outer nozzle section 111 are connected at the top such that all the incoming gas flows through an outer 4-sided channel 112, then over the component 6, and finally exists via a center chamber 115. The exhaust, then, in the case of the FIG. 10 nozzle, must extend into the inner chamber 115 via a tube 116, whereas in the case of the FIGS. 5 and 8 nozzles, the exhaust may be positioned only at the outer section. This variation is meant for use with SMT components such as QFP and PLCC.

Figure 12:
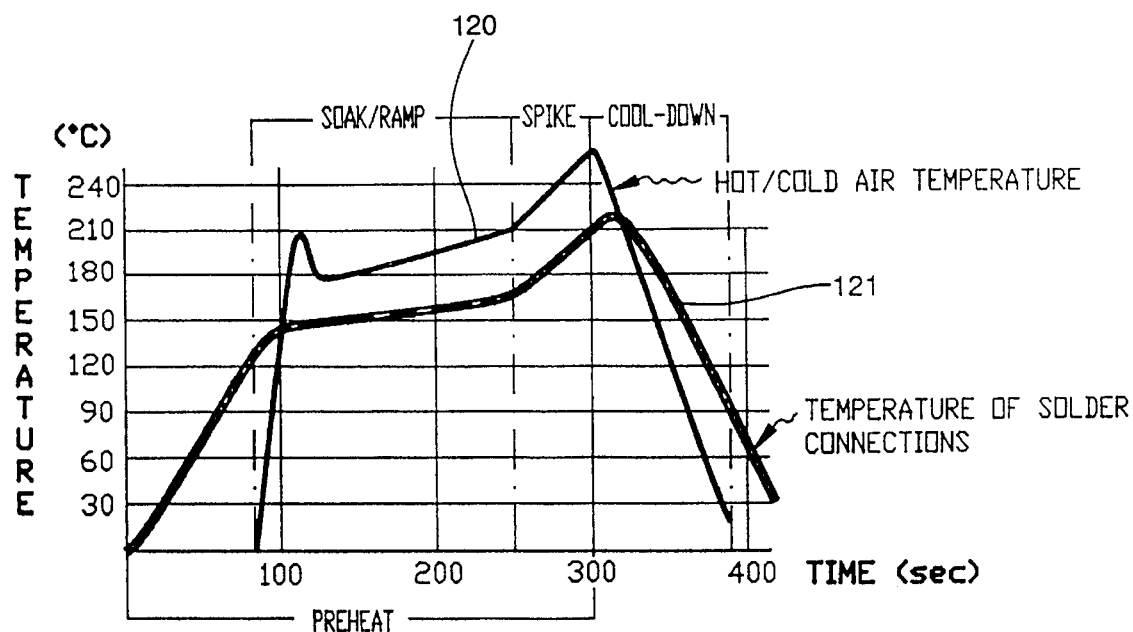
FIG. 12 shows a typical temperature profile for soldering a component to a PCB in a minioven according to the invention.

FIG. 12 shows a typical temperature profile for soldering a BGA component to a PCB with the minioven of FIG. 1. The thin curve labelled 120 shows the temperature of the gas at the temperature sensor 55. The thick curve 121 shows the temperature of the solder connections. For this cycle, the peak reflow temperature was 210° C. Preferably, the preheat cycle heats up the PCB to no more than 20°–30° below reflow temperature to obtain a uniform temperature on all solder connections. The temperature rise during the initial part of the preheat to 60° or so below reflow should not exceed 2°–4°/sec. The soak period should be about 2 min. The spike should take 30–45 sec. to reach reflow. The cooldown should be at the rate of 1°–2°/sec to a temperature of about 100° C. which can be deemed as cold enough to allow removal of the minioven. Desoldering is less critical and can be carried out by applying heat as indicated above for a specific duration known to cause the solder holding the component in place to melt and then releasing the spring-loaded tube 65 causing it to rise lifting the component off the board. Different sized components may require different heating times which are easily determined by a few simple experiments. The temperature is controlled by controlling in a known feedback manner the volume of gas supplied by the two gas conduits 46, 47, and the amount of electric current supplied to the heater 51. The control unit is readily programmed, as is well known, to supply preset quantities of gas for different durations coordinated with preset amounts of heating current to obtain any desired temperature profile. The reason for the two supplies of gas is that the supply via the top opening 39 is usually heated by the heater 70. But when rapid cooling of the component is wanted during the cooldown part of the cycle, cool gas via the opening 39 below the top opening is used to bypass the hot central chamber 62.

Among the advantages of the invention are: the ability to locally heat a single component at a time without undue heating of neighboring components; ease of operation which merely requires positioning the PCB section containing the component being worked and which forms a bottom part of the oven directly above the preheater and enclosing the component with the nozzle which forms the remaining part of the oven; an oven construction allowing for good heat transfer from hot gas to the component and venting of hot gas high above other components on the PCB, and providing a seal to the board; ready control of temperature cycles to be applied to the component; and provision for detachable nozzles to accommodate different-sized components.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. Apparatus for reworking a single component for soldering to or desoldering from a PCB, comprising:

(a) a gas delivery head comprising a generally tubular member having a top and a bottom and a portion at its bottom constructed to distribute incoming gas in first downward directions, (b) first means for supporting a PCB, (c) second means for supporting the gas delivery head over the PCB, said first and second means allowing relative positioning of the gas delivery head over a component on a PCB region, (d) third means for controllably supplying gas to the gas delivery head, (e) fourth means for heating the gas, (f) fifth means connected to the gas delivery head and forming with an underlying region of the PCB a minioven that surrounds a component on the PCB region, the fifth means for receiving the heated gas and directing same to heat the component to a solder reflow temperature and after heating the component to cause the hot gas to exit from the minioven at a location that will avoid unduly heating neighboring components on the PCB, (g) the fifth means comprising a detachable nozzle comprising nested inner and outer sections forming first and second channels, the first channel functioning to direct incoming gas at the component, the second channel functioning to direct outgoing gas away from neighboring components, the first channel being within the inner section and the second channel being a 4-sided channel formed between the inner and outer sections.

2. Apparatus for reworking a single component for soldering to or desoldering from a PCB, comprising:

(a) a gas delivery head comprising a generally tubular member having a top and a bottom and a portion at its bottom constructed to distribute incoming gas in first downward directions, (b) first means for supporting a PCB, (c) second means for supporting the gas delivery head over the PCB, said first and second means allowing relative positioning of the gas delivery head over a component on a PCB region, (d) third means for controllably supplying gas to the gas delivery head, (e) fourth means for heating the gas, (f) fifth means connected to the gas delivery head and forming with an underlying region of the PCB a minioven that surrounds a component on the PCB region, the fifth means for receiving the heated gas and directing same to heat the component to a solder reflow temperature and after heating the component to cause the hot gas to exit from the minioven at a location that will avoid unduly heating neighboring components on the PCB, (g) the fifth means comprising a detachable nozzle comprising nested inner and outer sections forming first and second channels, the first channel functioning to direct incoming gas at the component, the second channel functioning to direct outgoing gas away from neighboring components, the second channel being within the inner section and the first channel being a 4-sided channel formed between the inner and outer sections.

3. Apparatus for reworking a single component for soldering to or desoldering from a PCB, comprising:

(a) a gas delivery head comprising a generally tubular member having a top and a bottom and a portion at its bottom constructed to distribute incoming gas in first downward directions, (b) first means for supporting a PCB, (c) second means for supporting the gas delivery head over the PCB, said first and second means allowing relative positioning of the gas delivery head over a component on a PCB region, (d) third means for controllably supplying gas to the gas delivery head, (e) fourth means for heating the gas, (f) fifth means connected to the gas delivery head and forming with an underlying region of the PCB a minioven that surrounds a component on the PCB region, the fifth means for receiving the heated gas and directing same to heat the component to a solder reflow temperature and after heating the component to cause the hot gas to exit from the minioven at a location that will avoid unduly heating neighboring components on the PCB, (g) the fifth means comprising a detachable nozzle comprising nested inner and outer sections forming first and second channels, the first channel functioning to direct incoming gas at the component, the second channel functioning to direct outgoing gas away from neighboring components, the first channel being a 2-sided channel formed between first and second adjacent sides of the inner and outer sections, and the second channel being a 2-sided channel formed between third and fourth adjacent sides of the inner and outer sections.

4. Apparatus for reworking a single component for soldering to or desoldering from a PCB, comprising:

(a) a gas delivery head comprising a generally tubular member having a top and a bottom and a portion at its bottom constructed to distribute incoming gas in first downward directions, (b) first means for supporting a PCB, (c) second means for supporting the gas delivery head over the PCB, said first and second means allowing relative positioning of the gas delivery head over a component on a PCB region, (d) third means for controllably supplying cold gas to first and second inlets of the gas delivery head, (e) said generally tubular member comprising a heat-insulating structure forming first inner and second outer separated chambers extending between the first and second inlets, respectively, and the bottom portion of the gas delivery head, (f) fourth means within the first inner chamber for heating the gas supplied via the first inlet, (g) fifth means connected to the gas delivery head and forming with an underlying region of the PCB a minioven that surrounds a component on the PCB region, said fifth means for receiving the heated gas via the first inner chamber and directing same to heat the component to a solder reflow temperature and after heating the component to cause the hot gas to exit from the minioven at a location spaced above neighboring components on the PCB and that will thereby avoid unduly heating the neighboring components, said fifth means for receiving the cold gas via the second outer chamber and directing same to controllably cool the component below its solder reflow temperature, the cold gas via the second outer chamber bypassing the first inner chamber.

5. Apparatus for reworking a single component having a top surface and a bottom surface for soldering to or desoldering from a PCB, comprising:

(a) a gas delivery head comprising a generally tubular member having a top and a bottom and a portion at its bottom constructed to distribute incoming gas in first downward directions, (b) first means for supporting a PCB, (c) second means for supporting the gas delivery head over the PCB, said first and second means allowing relative positioning of the gas delivery head over a component on a PCB region, (d) third means for controllably supplying gas to the gas delivery head, (e) fourth means for heating the gas, (f) fifth means connected to the gas delivery head and forming with an underlying region of the PCB a minioven that surrounds a component on the PCB region, the fifth means for receiving the heated gas and directing same to heat the component to a solder reflow temperature and after heating the component to cause the hot gas to exit from the minioven at a location spaced above neighboring components on the PCB and that will thereby avoid unduly heating the neighboring components, (g) the fifth means comprising a detachable nozzle comprising nested inner and outer sections forming first inner and second outer vertical channels, the first channel functioning to direct incoming gas at the component, the second channel functioning to direct outgoing gas to the location and thus away from neighboring components, the first inner channel being located over the component for directing the heated gas to impinge directly without obstructions onto the top surface of the component.

6. Apparatus for reworking a single component for soldering to or desoldering from a PCB, comprising:

(a) a gas delivery head comprising a generally tubular member having a top and a bottom and a portion at its bottom constructed to distribute incoming gas in first downward directions, (b) first means for supporting a PCB, (c) second means for supporting the gas delivery head over the PCB, said first and second means allowing relative positioning of the gas delivery head over a component on a PCB region, (d) third means for controllably supplying gas to the gas delivery head, (e) fourth annular means for heating the gas, (f) a vacuum tube extending down through the center of the generally tubular member and through the fourth annular means and terminating at its bottom with means for vacuum attaching to the component, said vacuum tube being vertically movable with respect to the gas delivery head, (g) fifth means for biasing the vacuum tube to move upwardly relative to the gas delivery head when placed in contact with the component and capable of lifting the component when free of the PCB, (h) sixth means connected to the gas delivery head and forming with an underlying region of the PCB a minioven that surrounds a component on the PCB region, said sixth means for receiving the heated gas and directing same to heat the component to a solder reflow temperature and after heating the component to cause the hot gas to exit from the minioven at a location spaced from the vacuum tube and above neighboring components on the PCB and that will thereby avoid unduly heating the neighboring components, (i) said vacuum tube being capable of lifting the component when free of the PCB while the minioven still surrounds the component.

7. Apparatus as claimed in claim 6, further comprising means for locking the vacuum tube to the gas delivery tube when the vacuum tube is placed in contact with the component, and means for controllably releasing the locking means to cause the fifth means to apply a lifting force to the vacuum tube.

8. Apparatus for reworking a single component for soldering to or desoldering from a PCB, comprising:

(a) a gas delivery head comprising a generally tubular member having a top and a bottom and a portion at its bottom constructed to distribute incoming gas in first downward directions, (b) first means for supporting a PCB, (c) second means for supporting the gas delivery head over the PCB, said first and second means allowing relative positioning of the gas delivery head over a component on a PCB region, (d) third means for controllably supplying gas to the gas delivery head, (e) fourth means for heating the gas, (f) fifth means connected to the gas delivery head and forming with an underlying region of the PCB a minioven that surrounds a component on the PCB region, the fifth means for receiving the heated gas and directing same to heat the component to a solder reflow temperature and after heating the component to cause the hot gas to exit from the minioven at a location spaced laterally from and above neighboring components on the PCB and that will thereby avoid unduly heating the neighboring components, (g) the fifth means comprising a detachable nozzle comprising nested inner and outer sections forming first and second vertical channels, the first channel functioning to direct incoming gas at the component, the second channel functioning to direct outgoing gas to the location and thus away from neighboring components.

9. Apparatus as claimed in claim 8, wherein the outer section of the fifth means is configured to form at a bottom edge a temporary seal with the PCB region immediately surrounding the component to prevent incoming or outgoing gas from reaching neighboring components.

10. Apparatus as claimed in claim 8, wherein the second means comprises a table and supporting means on the table for the gas delivery head.

11. Apparatus as claimed in claim 10, further comprising a preheater embedded in the table and adapted to direct heat upward, said preheater being sized to approximately match the size of the component.

12. Apparatus as claimed in claim 8, wherein the gas delivery head further comprises, within the generally tubular member, a generally tubular heat shield forming an inner chamber within the heat shield and an outer chamber between the heat shield and the generally tubular member, both the inner and outer chambers being coupled for gas flow to the bottom portion of the gas delivery head, and means for introducing supplied gas to both the inner and outer chambers.

13. Apparatus as claimed in claim 12, further comprising an electric heater located within the inner chamber for heating the supplied gas, said heat shield separating the electric heater from the outer chamber.

14. Apparatus as claimed in claim 8, wherein the fifth means further comprises a suction tube with a suction cap positioned so that the suction cap can engage the component.

15. Apparatus as claimed in claim 14, further comprising means for biasing the suction tube away from the component, means for holding the suction tube so that the suction cap engages the component, and means for releasing the suction tube allowing it to move upward in response to temperature or time.

16. Apparatus as claimed in claim 15, wherein the fifth means further comprises a temperature sensor located close to the bottom of the gas delivery head.

* * * * *